(12) United States Patent
Chen et al.

(10) Patent No.: US 6,327,700 B1
(45) Date of Patent: Dec. 4, 2001

(54) METHOD AND SYSTEM FOR IDENTIFYING INSTRUMENTATION TARGETS IN COMPUTER PROGRAMS RELATED TO LOGICAL TRANSACTIONS

(75) Inventors: J. Bradley Chen; Brian N. Bershad, both of Seattle, WA (US)

(73) Assignee: Appliant Corporation, Seattle, WA (US)

( * ) Notice: Subject to any disclaimer, the term of this patent is extended or adjusted under 35 U.S.C. 154(b) by 0 days.

(21) Appl. No.: 09/327,697

(22) Filed: Jun. 8, 1999

(51) Int. Cl.$^7$ ....................................................... G06F 9/45
(52) U.S. Cl. ................................................................ 717/4
(58) Field of Search .......................... 717/4, 9; 702/179, 702/182

(56) References Cited

U.S. PATENT DOCUMENTS

| | | | | |
|---|---|---|---|---|
| 5,331,574 | * | 7/1994 | Temoshenko et al. | 364/551.01 |
| 5,590,056 | * | 12/1996 | Barritz | 364/550 |
| 5,872,976 | * | 2/1999 | Yee et al. | 395/704 |
| 6,002,872 | * | 12/1999 | Alexander, III et al. | 395/704 |
| 6,070,009 | * | 5/2000 | Dean et al. | 395/704 |
| 6,158,049 | * | 12/2000 | Goodwin et al. | 717/9 |
| 6,170,083 | * | 1/2001 | Adl-Tabatabai | 717/9 |
| 6,202,205 | * | 3/2001 | Saboff et al. | 717/9 |

OTHER PUBLICATIONS

Hansen et al. Experience with a Performance Analyzer for Multithreaded Applications. IEEE. pp. 124–131. May 1990.*
Siegle et al. Monitoring Program Behavior on SUPRENUM. ACM. pp. 332–341. Jul. 1992.*
Marazakis et al. Towards Adaptive Scheduling of Tasks In Transactional Workflows. ACM. pp. 604–611. 1995.*

* cited by examiner

Primary Examiner—Mark R. Powell
Assistant Examiner—Wei Zhen
(74) Attorney, Agent, or Firm—Summit Law Group PLLC

(57) ABSTRACT

A method and system for identifying sets of instructions within a computer program, execution of which serve as an indicator for processing of a transaction by the computer program and that together comprise a witness set. The witness set may be employed to monitor execution of the computer program and detect processing of the transaction. Witness sets are constructed by iteratively filtering an initial set of instructions based on profile data collected during execution of the computer program.

28 Claims, 4 Drawing Sheets

```
1  # include "appErrorLib.h"
2  /*a dispatch routine for database request handler */      104
3  void routeRequest (int requestType, RequestInfo * info)
4  {
5      switch (requestType)                    102
6      {
7          case:    116    employee            108
8                          fetchEmployee (info);
9                          break;
10         case:           customer            110
11                         fetchCustomer (info);
12                         break;
13         case:           supplier            112
14                         fetchSupplier (info);
15                         break;
16         case:           serviceProvider     114
17                         fetchProvider (info);
18                         break;
19         default:        appError (requestType, info);
20     }                                       106
21 }
```

```
1 # include "appErrorLib.h"
2 /*a dispatch routine for database request handler */
3 void routeRequest (int requestType, RequestInfo * info)
4 {
5      switch (requestType)
6      {
7           case:     employee
8                     fetchEmployee (info);
9                     break;
10          case:     customer
11                    fetchCustomer (info);
12                    break;
13          case:     supplier
14                    fetchSupplier (info);
15                    break;
16          case:     serviceProvider
17                    fetchProvider (info);
18                    break;
19          default:  appError (requestType, info);
20     }
21 }
```

*Fig. 1*

```
 1  routeRequest:   sub   sp, #12
 2                  mov   0(sp), r0
 3                  mov   4(sp), r1
 4                  mov   8(sp), r2      ⌐208
 5                  cmp   r1, #0
 6                  bne   L1    ⌐214
 7                  mov   r0, pc
 8                  mov   r1, r2         ⌐202
 9                  jsr   _fetchEmployee
10                  br    L5    ⌐209
11  L1  ⌐220       cmp   r1, #1
12                  bne   L2    ⌐215
13                  mov   r0, pc
14                  mov   r1, r2         ⌐203
15                  jsr   _fetchCustomer
16                  br    L5    ⌐210
17  L2  ⌐221       cmp   r1, #2
18                  bne   L3    ⌐216
19                  mov   r0, pc
20                  mov   r1, r2         ⌐204
21                  jsr   _fetchSupplier
22                  br    L5    ⌐211
23  L3  ⌐222       cmp   r1, #3
24                  bne   L4    ⌐217
25                  mov   r0, pc
26                  mov   r1, r2         ⌐205
27                  jsr   _fetchProvider
28                  br    L5
29  L4  ⌐223       mov   r0, pc         ⌐206
30                  jsr   _ _AppErrorLib_appError
31  L5  ⌐224       mov   r0, 0(sp)
32                  mov   r1, 4(sp)
33                  mov   r2, 8 (sp)
34                  add   sp, #12
35                  ret   r0
```

*Fig. 2*

| | | | | |
|---|---|---|---|---|
| 308 — | 0000 | 6B40 — 306 | 0074 | 6008 |
| | 0004 | 00CD | 0078 | F100 |
| 212 — | 0008 | 1080 — 310 | 007C | E010 |
| | 000C | 0000 | 0080 | 0210 — 322 |
| | 0010 | B108 | 0084 | 401C |
| | 0014 | 1000 | 0088 | 9300 — 317 |
| | 0018 | 4D10 | 008C | 0BE2 |
| | 001C | 8200 | 0090 | 0400 |
| | 0020 | 08D2 | 0094 | 0313 |
| | 0024 | 0040 | 0098 | 600B |
| | 0028 | 0013 — 314 | 009C | 3100 |
| | 002C | 6004 | 00A0 | E010 |
| | 0030 | 7100 | 00A4 | 0210 — 323 |
| | 0034 | E010 | 00A8 | 401E |
| | 0038 | 0210 — 320 | 00AC | 5300 — 318 |
| | 003C | 401A | 00B0 | 0BE1 |
| | 0040 | 2300 | 00B4 | 00E0 — 324 |
| | 0044 | 0BE2 | 00B8 | 04CD |
| | 0048 | 0400 | 00BC | E110 |
| | 004C | 0013 — 315 | 00C0 | 6000 |
| | 0050 | 6006 | 00C4 | 0D01 |
| | 0054 | B100 | 00C8 | 0600 |
| | 0058 | E010 | 00CC | 04D1 |
| | 005C | 0210 — 321 | 00D0 | 1060 |
| | 0060 | 401B | 00D4 | 008D |
| | 0064 | C300 — 316 | 00D8 | 26A4 |
| | 0068 | 0BE2 | 00DC | 000C |
| | 006C | 0040 | 00E0 | D030 |
| | 6070 | 0213 | | |

| | | | |
|---|---|---|---|
| BC00 | 6B40 | BC74 | 6BC8 |
| BC04 | 00CD | BC78 | F100 |
| BC08 | 1080 | BC7C | E010 |
| BC0C | 0000 | BC80 | 0210 |
| BC10 | B108 | BC84 | 436A |
| BC14 | 1000 | BC88 | 430B |
| BC18 | 4D10 | BC8C | CBE2 |
| BC1C | 8200 | BC90 | 0400 |
| BC20 | 08D2 | BC94 | 0313 |
| BC24 | 0400 | BC98 | 6BCB |
| BC28 | 0013 | BC9C | 3100 |
| BC2C | 6BC4 | BCA0 | E010 |
| BC30 | 7100 | BCA4 | 0210 |
| BC34 | E010 | BCA8 | 49BA |
| BC38 | 0210 | BCAC | C30B |
| BC36 | 4BE1 | BCB0 | CBE1 |
| BC40 | 030B | BCB4 | 00E0 |
| BC44 | CBE2 | BCB8 | 04F1 |
| BC48 | 0400 | BCBC | 3210 |
| BC4C | 0113 | BCC0 | 6000 |
| BC50 | 6BC6 | BCC4 | 0D01 |
| BC54 | B100 | BCC8 | 0600 |
| BC58 | E010 | BCCC | 04D1 |
| BC5C | 0210 | BCD0 | 1060 |
| BC60 | 4109 | BCD4 | 008D |
| BC64 | 030B | BCD8 | 26A4 |
| BC68 | CBE2 | BCDC | 000C |
| BC6C | 0040 | BCE0 | D030 |
| BC70 | 0213 | | |

*Fig. 4*

METHOD AND SYSTEM FOR IDENTIFYING INSTRUMENTATION TARGETS IN COMPUTER PROGRAMS RELATED TO LOGICAL TRANSACTIONS

TECHNICAL FIELD

The present invention relates to techniques for measuring the response time and other parameters related to processing of transactions by computer programs and, in particular, to a method and system for determining a set of locations within a computer program that are executed during processing of a particular transaction and that thus comprise a witness set for the transaction.

BACKGROUND OF THE INVENTION

During the past thirty-five years, advancements in computer hardware and programming methodologies have fuelled the development of increasingly useful and complex computer-based tools for automating business processes. Currently, both custom-built and commodity computer programs are pervasive in both small and large businesses. Computer programs manage information, including inventory control data, employee data, customer data, and financial data. Computer programs also manage business transactions, such as airline reservation systems and automated order entry, and may even provide a large portion of the business interface between a business and people who interact with the business, such as the web pages of an Internet-based business or automated telephone order-entry systems.

Computer programs, whether used internally within a business, used as a portion of an interface between the business and customers or suppliers, used for supporting general computational tasks, used for conducting scientific analyses or data processing, or for many other reasons, can be considered to be transaction processing systems. For example, an airline reservation system processes flight schedule requests, seat availability requests, and reservation requests. As another example, an order entry system may process submitted order forms. As still another example, an operating system may process an internally generated request to read a block of data from a mass storage device. Transactions are generally defined to have a starting point, often corresponding to the input of data into the computer system, and an ending point corresponding to the completion of a set of related activities, or functions, that together comprise a logical operation. For example, in an airline reservation system, a reservation request transaction may be defined to start with a travel agent inputting, through a graphical user interface ("GUI"), a combination of keystrokes or mouse clicks that indicate to the airline reservation system the beginning of a request for reservation of one or more seats on a future flight. Starting from the initial input by the travel agent, the airline reservation system conducts numerous related operations in order to make a reservation, and finally displays to the GUI an indication that the reservation has been successfully completed, a logical point to define as the ending point of the transaction. The related set of operations conducted by the airline reservation system in order to carry out the transaction may include solicitation and processing of additional input information, such as the customer's name, time of travel, etc., searching a database, based on the input information, for stored data representing the desired flight, checking whether the requested number of seats are available, and updating the stored data to reflect the reservation. The processing of a single transaction by a computer program may involve execution of hundreds or thousands of software routines and millions of computer instructions.

A transaction is the execution of a particular group of instructions by a computer program that have an identifiable effect on some aspect of the environment in which the computer program is running. While many logical transactions that may be defined in the context of a business application program may correspond to business transactions having certain well-known data integrity properties, many other logical transaction are unrelated to business transactions. For example, the detection of a hardware event within a computer system by an operating system and handling of the detected event through one or more subroutine calls may constitute a logical transaction within the context of an operating system program.

Computer programs are continuously subjected to monitoring of various parameters and are regularly refined and redeveloped in accordance with the results of the monitoring. One important parameter is the response time with which a computer program processes a given type of transaction, or, in other words, the time between the start of the transaction and the end of the transaction. Various types of response times may be measured. For example, the total wall clock time of the transaction is often a useful parameter for efficiency studies. The difference of the wall clock time of the transaction and that period of time within the transaction during which the computer program waits for user input may, in some cases, be a more useful parameter. Various statistical measurements of response times, including the variance and standard deviations of different types of response times may also be useful. Another useful parameter is a count of the number of times a particular transaction occurs, and, in some cases, an indication of whether a particular transaction does or does not occur. Such information may allow the usage of various software components to be monitored.

There are a number of different approaches for measuring the different types of response times. Manual methods may involve human observers recording response times using a stopwatch, pencil, and paper. In certain specific types of computer programs, notably database management systems, partially and fully automated techniques may be employed in order to collect large amounts of performance data and efficiently process those large amounts of performance data. These semi-automated and fully automated methods rely on incorporating data collection functionality into computer programs. A standard for instrumenting computer programs for automatic collection of response time data, called the Application Response Measurement ("ARM") interface, has been developed. The ARM interface is an application programming interface ("API") comprising a set of functions that can be called from within a computer program. Using the ARM API, functions can be called to identify the starting and ending points of transactions and to measure the response times associated with execution or processing of each transaction. Thus, the ARM API is a high-level programming interface, and the functions within that interface are incorporated within the high-level programming language description of a computer program in order to instrument the computer program for subsequent performance monitoring. Additional APIs for monitoring computer programs include the Simple Network Management Protocol ("SNMP") API and the Remote Management ("RMON") API.

The approach represented by the ARM API has many deficiencies. Specific deficiencies of the ARM API include a flat name space for transactions and a requirement that a computer program have a single starting and stopping point with respect to the ARM API. Unfortunately, modem computer programs tend to be extremely large, complex systems developed by large, hierarchically-ordered teams of software developers and engineers. In such a development environment, a flat name space for transaction names becomes a difficult problem, requiring a coordinated effort for partitioning the flat name space among the various groups and subgroups of developers and engineers. Because various groups of developers and engineers may work more or less independently on portions of a computer program, the single starting point and stopping point requirement of the ARM API may introduce additional coordination problems when separately developed portions of a computer program are merged together.

There are more fundamental problems with the instrumentation approach represented by the ARM API. Generally, developers and engineers are concerned with the functionality and correctness of that portion of the API that they develop. They may often lack a broad perspective on the computer program that would enable them to both appropriately and meaningfully define transactions and to correctly instrument the portion of the computer program that they are developing in order to collect response time data for transactions. Even having such a perspective, it is a notoriously difficult, if not impossible, task to anticipate and instrument potentially useful transaction in advance of using a computer program. Quite often, the need for monitoring a particular logical transaction may only be apparent after a problem is later discovered. Furthermore, source code tends to be dynamic and unstable. Large computer programs are constantly refined, patched, and otherwise altered in response to error reports, functionality requests, and efficiency monitoring. Even if reasonable ARM API function calls are inserted into an initial version of a large computer program, they may quickly become sterile or inoperative due to modifications and reorganizations of the computer program unless great effort is made to modify the ARM API calls along with modifications of the computer program source code.

A potentially greater problem is that, in a complex and large computer program, it may be very difficult to ascertain target locations within the source code of a computer program in which to insert ARM instrumentation. Frequently, an outside observer's definitions of starting and ending points of transactions, based on observing the interface between human users and a running computer program do not closely correspond to logical entry points within the computer program. For example, an observer of a computer program may define the starting point of an airline reservation transaction to be the point at which a travel agent enters input to a GUI, but, in the running computer program, a large number of generalized GUI and operating system routines, called during processing of many different types of transactions, may precede a first recognizable call to a computer program transaction processing routine logically corresponding to the transaction. In systems comprising a number of asynchronously executing tasks or programs, the logical starting point of a transaction, as determined by an outside observer, may not consistently correspond to execution of a particular instruction or routine within one of the tasks or programs, but may instead vary depending on the state of the entire computer system. In general, it is an extremely difficult problem to identify instrumentation points corresponding to conceptual transactions. It is a difficult problem during development of a computer program, and an even more difficult problem after the computer program has been developed.

Another problem with the approach to instrumentation represented by the ARM API is that the approach relies on the ability of a developer or performance analyst to access, modify, and recompile the source code of a computer program. However, there are many cases where only an executable computer program, or, in other words, a machine code version of a computer program, is available. For example, a business may have obtained the computer program from a third-party software vendor which has neither instrumented the computer program at the source code level nor provides access to the source code of the computer program.

Another problem with the performance monitoring approach represented by the ARM API is that meaningful conceptualization of transactions often cannot occur prior to extended use of a computer program within a business. Moreover, the environment within a given business may change over time, requiring a re-conceptualization of transactions to correspond to new uses of a computer program in the changed environment. In such cases, it is difficult to foresee possible conceptualizations of transactions during development of a computer program, thus requiring difficult and expensive re-instrumentation of the source code of the computer program. As a practical matter, even within single organizations, efficiency experts and monitors may not have access to the source code of a computer program which they are attempting to analyze.

Still another problem with the performance monitoring approach represented by the ARM API is that, despite monitoring instrumentation present within a computer program, monitored events may fail to be reported. For example, a computer program may be instrumented with ARM API calls, but the environment in which monitoring occurs is configured to receive and respond to SNMP or RMON calls.

Thus, computer program developers, computer program vendors, business organizations that use computer programs, and efficiency and response time monitoring analysts and technicians have all recognized a need for a method and system for determining instrumentation targets within computer programs for the collection of data related to various efficiency parameters, including response times, with respect to one or more logical or conceptual transactions carried out by the computer program.

SUMMARY OF THE INVENTION

The present invention provides a method and system related to monitoring computer programs, including application programs, for measuring various parameters, including response times, related to a transaction carried out by the computer program. In one embodiment of the present invention, the method and system identifies a set of instructions, called a witness set, that are executed when a particular transaction is processed by a computer program. First, the method and system constructs a monitor set comprising a relatively large subset of instructions within the computer program. The method and system may choose instructions for inclusion in the monitor set based on various characteristics, including the type of the instructions and including information related to the instructions contained in non-instruction portions of the executable computer program, such as header sections. For example, the method and system may choose call instructions that call library routines for inclusion in the monitor set. The method and system may then introduce instrumentation into the computer program in order to generate profiles during execution of the instrumented computer program. Such profiles include counts of the number of times each instruction in the monitor set is executed. Alternatively, the method and system may rely on prior instrumentation of the computer program, or on previously generated profiles. Finally, the method and system repeatedly execute the program in order to carry out the transaction under different conditions and in different ways to generate profiles, filter the profiles to obtain subsets of instructions that are potentially relevant to the particular transaction, and generate a candidate witness set by conducting a series of set operations on the generated subsets of instructions. A candidate witness set is evaluated according to various quality criteria and, when a candidate witness set meets or exceeds the various quality criteria, the candidate witness set is identified as a witness set corresponding to the particular transaction. Otherwise, the process may be repeated, until a witness set is obtained, using a different monitor set, different profile filters, or employing other parametric variations and combinations of variations in order to produce additional potential witness sets for evaluation.

BRIEF DESCRIPTION OF THE DRAWINGS

FIG. 1 shows a small routine that may be included within a hypothetical computer program.

FIG. 2 is an assembly language version of the routine "routeRequest," the high-level source code for which is shown in FIG. 1.

FIG. 3 shows an intermediate machine code version of the routine "routeRequest."

FIG. 4 shows an executable machine-code version of the routine "routineRequest."

DETAILED DESCRIPTION OF THE INVENTION

One embodiment of the present invention is a method and system for identifying a set of instructions within an executable version of a computer program that are executed each time a transaction is processed by the computer program. Detection of the execution of this set of instructions, called a witness set, at run time is an indication that the transaction is being processed by the computer program. Once a witness set has been determined, instrumentation internal to the executable computer program, external instruction execution monitoring programs, or a combination of both may be employed to monitor the running computer program to detect processing of the transaction. The addresses included in the witness set may be ordered sequentially with respect to their order of execution during processing of the transaction. One instruction of the witness set may be associated with the start of the transaction, and a later-executed instruction within the witness set may be associated with the end of the transaction. The ability, provided by the present invention, to recognize the processing of a transaction in a running executable computer program allows for collection of data for measuring the response time of the computer program in processing the transaction under a variety of different conditions and in different environments without the need for re-instrumentation and recompiling. Moreover, the method and system of the present invention allow for determination of witness sets associated with transactions conceptualized by performance analysts observing the running computer program, the environment in which the computer program is used, and interactions between human users and the computer program. It is also possible to use the execution of instructions within a witness set to trigger invocations of ARM API routines, so that response time measurements can be recorded through the well-defined, standardized ARM API interface. Because the executable version of a computer program can be analyzed and monitored via the method and system of the present invention, many problems associated with a priori instrumentation of computer program source code are avoided.

It should be noted that the word "transaction" is intended in the above paragraph, and in the subsequent discussion, below, to have a broad meaning. Although operations such as database management systems transactions, order-entry transactions, and other types of high-level operations are included within this broad meaning, the word "transaction" is intended to include many other types of events that may occur during the execution of a computer program, including internal error conditions, changes in internal data structures, and other such operations. A transaction is, for the purposes of this section, the execution of a particular group of instructions by a computer program that have an identifiable effect on some aspect of the environment in which the computer program is running. Commonly, a transaction may be initiated by one or more events, such as input of data or commands to a running computer program. A witness set may include a subset of the particular group of transactions that together compose a transaction, but may also include additional instructions executed before or after the particular group of transactions that together compose a transaction.

It should also be noted that the word "instruction" is likewise intended to have a broad meaning in this section. An instruction may include a machine code instruction within an executable program, an assembly language statement within an assembly language program, a statement within a source-code-language program, Java byte code instructions, or other such component within a description of a computer program. The method and system of the present invention may be implemented to construct witness sets containing any of these various types of instructions. In the example below, an embodiment oriented towards constructing witness sets comprising machine code instructions is provided, but this embodiment is not intended to limit the scope of the method and system to machine code instructions.

A motivation for the present invention will be provided, below, with reference to an example illustrated in FIGS. 1–4 and Tables 1–4. Following this example, a C-like pseudo-code implementation of one embodiment of the present invention will be provided.

FIG. 1 shows a small routine that might be included within a hypothetical computer program. The routine in FIG. 1 is written in a C-like source-level language. This routine, called "routeRequest," represents an intermediary dispatch routine that takes, as arguments, an integer "requestType" 102 and a pointer "info" 104 to information associated with a request. Depending on the value of the argument "requestType," routeRequest calls either the library routine "appError" 106 on line 19 or one of the following computer program routines: "fetchEmployee" 108, "fetchCustomer" 110, "fetchSupplier" 112, or "serviceProvider" 114. Thus, routeRequest funnels a general request for retrieval of information into specific request handlers that address retrieval of employee information, customer information, supplier information, and service-provider information, respectively.

FIG. 2 is an assembly language version of the routine "routeRequest." This assembly language version of the routine "routeRequest" is based on a simple, hypothetical machine architecture, a portion of which is described, below, in Table 1:

TABLE 1

| instruction | opcode | # arguments | arguments |
|---|---|---|---|
| jsr | 04 | 1 | dest |
| ret | 02 | 1 | dest |
| mov | 10 | 2 | dest, source |
| cmp | 20 | 2 | source2, source1 |
| br | 30 | 1 | dest |
| bne | 36 | 1 | dest |
| add | 6A | 2 | dest, source |
| sub | 6B | 2 | dest, source |

The assembly language version of the routine "routeRequest" includes the following types of instructions, described above, in Table 1: (1) "jsr," an instruction that calls the routine specified by an address in a single destination argument; (2) "ret," a return-from-subroutine instruction that directs program execution to a calling subroutine specified by an address in a single destination argument; (3) "mov," a data transfer instruction that moves the value specified by a source argument into a memory location specified by a destination argument; (4) "cmp," an instruction that compares values specified by two source arguments; (5) "br," a branch instruction that directs execution to an address specified by a single destination argument; (5) "bne," a conditional branch instruction that directs execution to an address specified by a single destination argument in the case that execution of the most recent "cmp" instruction has determined that the two values supplied to the "cmp" instruction as arguments are not equal; (7) "add," an instruction that adds a value specified by a source argument to a value specified by a destination argument; and (8) "sub," an instruction that subtracts the value specified by a source argument from the value specified by a destination argument.

The hypothetical assembly language used for the assembly language version of the routine "routeRequest" specifies general machine registers in two characters, the character "r" followed by a single decimal digit. A special program counter register is specified as "pc" and a special stack pointer register is specified as "sp." The simple assembly language in FIG. 2 employs three modes of memory location addressing: (1) direct addressing, where the address is specified by an alphanumeric label, such as "L1" or "_fetchEmployee;" (2) register-based addressing, where the contents of a specified register contain the address; and (3) relative addressing, notationally specified as a decimal value offset prefixing a parenthesized register, such as "8(sp)," specifying a memory location with an address 8 bytes greater than the address stored in the register "sp." Literal values are indicated in the assembly language by a "#" prefixing a decimal representation of the value.

Note that much of the high-level mnemonic information and comments included in the source code of FIG. 1 are lost in the translation to assembly language in FIG. 2. For example, the fact that the first argument supplied to the routine "routeRequest" is an integer representation of a request type, apparent on line 3 of FIG. 1, is not readily discernible in the assembly language versions of the routine "routeRequest" shown in FIG. 2. Instead, that argument is represented in FIG. 2 as a value contained in the register "r1." The five routines called by the routine "routeRequest" are discernible in the assembly language version, shown in FIG. 2, as "jsr" instructions 202–206. The "switch" statement 116 on line 5 of FIG. 1 is implemented, in assembly language, as a series of "cmp" instructions 208–211 followed by "bne" instructions 214–217.

Although assembly language was previously an obligatory intermediate phase in the process of compiling source-level language, such as the routine shown in FIG. 1, to machine code, it is currently more common to compile source-level language to machine code without an intermediate assembly code step. FIG. 3 shows a machine code version of the routine "routeRequest." Machine code is a rather direct translation of the assembly code shown in FIG. 2. The machine code is shown in two columns 302 and 304 consisting of hexadecimal address and hexadecimal value pairs. For example, the hexadecimal value "6B40" 306 is stored in address location "0" 308. Machine code thus comprises a sequence of numbers. Within the hypothetical machine architecture used for the current example, each 8-bit quantity of memory is separately addressable. In the machine code representation of FIG. 3, 32-bit values are shown stored in byte-addressable memory locations, each memory location having an address 4 bytes greater than the previous memory location. For example, the second 32-bit value "00CD" 310 is stored in a 32-bit memory location addressed as "0004" 312. The translation of assembly language instructions into numbers is relatively straightforward, and is described with reference to Tables 2 and 3, below:

TABLE 2

| mask | meaning | assembly code example 1 | assembly code example 2 | machine code |
|---|---|---|---|---|
| 00 | direct | #12 | fetchProvider | 4 bytes |
| 01 | register | r2 | r1 | 1 byte |
| 10 | register + offset | 4(sp) | 8(sp) | 4 bytes + 1 byte |

TABLE 3

| # arguments | Instruction format |
|---|---|
| 1 | opcode + mask/argument |
| 2 | opcode/mask/arguments |

The addressing mode of each argument specified for an instruction is indicated by a mask comprising 2 bits. As indicated in Table 2, direct addressing is indicated by the mask "00," register addressing is indicated by the mask "01," and indirect register addressing is indicated by the mask "10." Direct addressing indicates that the 4-byte value representing an argument follows the instruction in memory. Register addressing indicates that a single byte specifying the register containing the value of an argument follows the instruction in memory, and direct register addressing indicates that a 4-byte offset followed by a single byte register specification follows the instruction in memory. Referring to Table 3, single argument instructions are formed by adding the mask to a two-byte opcode, followed by one, four or five bytes representing the argument, depending on the addressing mode specified by the mask. Two-argument instructions, by contrast, are formed from a two-byte opcode, followed by a byte including a two-bit mask for each argument, followed by one, four, or five bytes for each argument, depending on the addressing mode for that argument. For example, the first instruction in the assembly language version of the routine "routeRequest" is:

sub sp, #12

This instruction is translated into the eight bytes "6B40 00CD" stored in the first two 32-bit memory locations of the machine code version of the routine "routeRequest" shown in FIG. 3 at addresses "0000" and "0004," respectively. The first two bytes "6B" represent the opcode of the "sub" instruction, as shown above in Table 1. The next byte "4" is the mask for the source and destination registers, represented in binary as "0100," indicating direct addressing for the source argument and register addressing for the destination argument. Next, the four bytes "000C" represent the decimal value "12," and the final byte "D" is a numeric designation of the register "sp."

The machine code shown in FIG. 3 is intermediate machine code. In intermediate machine code, addresses are represented generally as relative offsets either from the beginning of a subroutine or from the beginning of tables that contain pointers to other subroutines or to library subroutines. In FIG. 3, the addresses 314–318 internal to the subroutine "routeRequest," represented in FIG. 2 by the alphanumeric labels "L1," "L2," "L3," "L4," and "L5," 220–223, are indicated by single underlining. The table-based addresses 321–323 for the application routines "fetchEmployee" 202, "fetchCustomer" 203, "fetchSupplier" 204, and "fetchProvider" 205 are indicated by double underlining, and the table-based library routine address "_AppErrorLib_AppError" is indicated by a wavy line 324.

The intermediate-level machine code of FIG. 3 is finally transformed into executable code that appears within a loaded executable by substituting absolute addressing for the subroutine-based addressing of the intermediate-level code and resolving internal subroutine and external routine hardware routine addressing. In Table 4, below, the initial intermediate-level address indication and the final executable address indication for each of the five routines called by the subroutine "routeRequest" are shown:

TABLE 4

| routine | initial | final |
|---|---|---|
| fetchEmployee | 01A2 | BE10 |
| fetchCustomer | 01BC | 1090 |
| fetchSupplier | 01C9 | 36A4 |
| fetchProvider | 01E5 | 4BAC |
| appError | CDE1 | F132 |

The executable machine-code version of a computer program comprises millions and millions of contiguous memory locations containing mixed instructions and data, a small portion of which might correspond to the routine "routeRequest," illustrated in FIG. 4. The executable program contains almost no information related to the organization, function, and meaning of the instructions. This is dramatically illustrated in the above-referenced figures. The high-level source-code representation of the routine "routeRequest," shown in FIG. 1, is readily understandable to most trained computer programmers. However, the final machine-code version of the routine "routeRequest," shown in FIG. 4, can be only partially deciphered by very laborious backward translation to a list of instructions resembling the assembly language version of the routine "routeRequest" shown in FIG. 2. When only executable machine code of a computer program is available, the task of instrumenting or monitoring execution of the machine code in order to detect processing of a particular transaction is a daunting, if not a seemingly impossible task. First, instructions executed during processing of the transaction must be identified. Because processing of a transaction may involve hundreds of thousands of subroutine calls and execution of many millions of instructions dispersed throughout the executable, identifying instructions related to a particular transaction is difficult. Moreover, many of the instructions executed during processing of a transaction may correspond to common routines that are executed in processing of many different transactions, making these commonly executed instructions, by themselves, poor indications of the processing of a particular transaction.

One approach to discovering a witness set for a particular transaction, taken by one embodiment of the present invention, is to start with a relatively large set of candidate instructions, instrument the executable computer program in order to profile execution of the candidate instructions, and then iteratively filter the candidate instructions based on profiling the executable computer program until a reasonable witness set remains. The final witness set generally contains a number of instructions that are executed only when a particular transaction is processed. The final witness set may also contain instructions that are executed in a less transaction-specific manner, but may instead identify groups of transactions or mark, in combination with transaction-specific instructions, the starting or ending points of transactions. For example, instructions that call subroutines, such as the "jsr" instructions in the assembly language version of the routine "routeRequest" in FIG. 2, may be a reasonable initial set of candidate instructions from which to choose a witness set. Of course, most of these candidate instructions will be eliminated during the filtering process, since most subroutines in a large computer program are either not invoked during processing of a particular transaction or are invoked during the processing of many different types of transactions.

The goal of the filtering process is to identify instructions whose execution is characteristic of processing of a particular transaction. For example, the routine "routeRequest" in FIG. 1 may be an intermediary dispatch routine that is called after execution of a number of GUI routines that solicit and process user input, but that is called before execution of any subroutines particular to processing of various types of data retrieval transactions. The GUI user input processing routines are probably executed for a large number of different types of transactions. These routines may, for example, display graphical menus from which a user may select a particular transaction. The call instruction that invokes execution of the routine "routeRequest" is executed during processing of four different types of transactions that retrieve employee data, customer data, supplier data, and service provider data, respectively. The instruction that invokes the routine "routeRequest" may, in some circumstances, be a valuable member of a witness set, since it signals processing of any of four different transactions. If a witness set is being constructed for processing of the transaction that retrieves employee data, then the jsr instruction "jsr_fetchEmployee" (202 in FIG. 2) corresponding to the call to the routine "fetchemployee" on line 8 of FIG. 1 may be the first unambiguously particularized instruction involved in processing of the employee data retrieval transaction. It is very desirable that witness sets include such unambiguously particularized instructions. However, it may also be useful to include somewhat ambiguous instructions, such as the instruction that invokes the routine "routeRequest" in witness sets. It may even be useful, for some types of performance monitoring, to include instructions in a witness set that are executed for the processing of many different types of transactions.

One embodiment of the present invention is illustrated in the following C-like pseudo-code implementation. This embodiment may be implemented in many different ways, using any number of different programming languages, with a level of automation ranging from computation interleaved with human user analysis and parameter selection to fully automated computation. The C-like pseudo-code implementation is provided to illustrate one embodiment of the present invention rather than to limit the scope of the present invention to the provided pseudo-code implementation. Comments are provided, in the C-like pseudo-code implementation, bracketed by "/*" and "*/" delimiters, as in the C programming language.

```
1    findWitnessSet (program *prog, InstructionSet *witnessSet,
         Transaction *trans)
2    {
3        InstructionSet  initialMonitorSet;  /* initial instructions
                                                for instrumentation */
4        InstructionSet  monitorSet;         /* instructions to
                                                instrument for each
                                                iteration */
5        Profile         nextProfile;        /* profile generated
                                                from execution of
                                                program */
6        Boolean         qualified;          /* indicates whether
                                                adequate witness set
                                                found */
7        SetOperation    op;                 /* next set operation
                                                to perform */
8        int             numTrans;           /* number of times
                                                to process
                                                transaction */
9        ExecutionPlan   plan;               /* plan for next
                                                witness set
                                                determination */
10
11       initializeMonitorSet (&initialMonitorSet);
12       setEqual (&monitorSet, &initialMonitorSet);
13       qualified = FALSE;
14
15       while (!qualified)   /* iterate until a suitable witness
             set has been found */
16       {
17           instrumentProgram (&monitorSet, prog);
18           initializePlan (&plan); /* determine an initial witness
                 set determination plan */
19           clear (witnessSet);
20           while (getNextExecutionParameters (&plan,
                 &numTrans, &op))
21           {
22               execute (prog, trans, numTrans, &nextprofile);
                     /* execute program */
23               filter (&nextProfile, numTrans, op, trans);
                     /* filter resulting profile */
24               switch (op) /* perform set operation indicated by
                     execution plan */
25               {
26                   case SET_DIFFERENCE:
27                       setDifference (witnessSet, &nextProfile);
28                       break;
29                   case SET_UNION:
30                       setUnion (witnessSet, &nextProfile);
31                       break;
32                   case SET_INTERSECTION:
33                       setIntersection (witnessSet, &nextProfile);
34                       break;
35               }
36           }
37           qualified = qualifyWitnessSet (witnessSet);
38           if (!qualified) refineMonitorSet (&monitorSet,
                 &initialMonitorSet, &plan, trans);
39       }
40   }
```

The function "findWitnessSet," provided above, takes the following arguments: (1) a pointer "prog" to a computer program; (2) a pointer "witnessSet" to a set of instructions; and (3) a pointer "trans" to a transaction. The data type described by the defined type "InstructionSet" is a type of data structure that contains, in the current implementation, a set of addresses of instructions within a program. The data type described by the defined type "Transaction" is a type of data structure that contains information about a particular transaction, including information about how to cause the program pointed to by prog to process the transaction and information about how processing of the transaction can be identified by either a human user or by automated methods. Additional type definitions used in the C-like implementation include: (1) "Profile," a type of data structure that contains the results of monitoring execution of a program in the form of instruction/count pairs, where each instruction executed during execution of the program is paired with a count of the number of times that the instruction was executed; (2) "SetOperation," a defined type that includes the set operation values "SET_DIFFERENCE," "SET_UNION," and "SET—INTERSECTION;" and (3) "ExecutionPlan," a type of data structure that contains pairs of indications, each pair including a number of times to process the transaction referenced by the pointer "trans" during, the next execution of the program referenced by the pointer "prog" and a SetOperation value to indicate the set operation to apply to the profile resulting from execution of the program referenced by the pointer "prog."

On lines 3–9, above, the following local variables are declared: (1) "initialMonitorSet," an initial set of instructions to be monitored, or watched, during execution of the program referenced by the pointer "prog;" (2) "monitorSet," a set of instructions to be monitored, or watched, during execution of the program referenced by the pointer "prog;" (3) "nextProfile," a profile that holds the results of monitoring execution of the program referenced by the pointer "prog;" (4) "qualified," a Boolean variable that stores an indication of whether or not the witness set is of adequate quality; (5) "op," a variable that stores the next set operation to perform on nextProfile and witnessSet; (6) "numTrans," an integer variable that stores the number of times the transaction referenced by the pointer "trans" needs to be processed during the next execution of the program referenced by the pointer "prog;" and (7) "plan," the execution plan for construction of the witness set.

The function "findWitnessSet" initializes the variables "initialMonitorSet," "monitorSet," and "qualified" on lines 11–13. The variable initialMonitorSet is initialized, on line 11, to contain some logical set of instructions to monitor in order to generate profiles of execution of the program referenced by the pointer "prog." Instructions of a certain instruction type, instructions associated with calling of certain library routines, and instructions known to be useful markers from previous witness set construction might be selected for this initial monitor set. The variable "monitorSet" is assigned to have the value of the variable "initialMonitorSet" by the call to function "setEqual" on line 12. On line 13, qualified is initialized to contain the Boolean value FALSE.

Lines 15–39 comprise a while-loop during each iteration of which a witness set is constructed and evaluated. When the evaluation, carried out by a call to the function "qualifyWitnessSet," on line 37, is successful, the current witness set is selected as the witness set associated with the transaction referenced by the pointer "trans" and the function "findWitnessSet" returns. If the evaluation is unsuccessful, returning a Boolean value FALSE that is stored in the variable "qualified," then the witness set construction parameters are refined or changed via a call to function "refineMonitorSet," on line 38, and the while-loop iterates again, starting on line 17, to construct a different witness set. It is assumed that an adequate witness set can be found for any transaction, so that the function "findWitnessSet" will always return.

Construction of a witness set begins on line 17. First, the computer program is instrumented via a call to the function "instrumentProgram" which takes, as arguments, the pointer "prog" and the address of monitorSet. The function "instrumentProgram" prepares for monitoring execution of the instructions in monitorSet during execution of the program referenced by the pointer "prog." Monitoring can be accomplished by replacing monitored instruction with subroutine calls or jump instructions that cause execution of code that increments a counter associated with the instruction as well as execution of the replaced instruction, or can be accomplished using various types of monitoring routines that can monitor instruction execution by the computer on which a program runs. It should be noted that instrumentation may, under certain circumstances, be an optional step. For example, programs may be instrumented in advance, and the preexisting may be used in place of an explicit instrumentation step. Next, on line 18, the variable "plan" is initialized to contain a number of pairs of indications, each pair including a numbers of times to process the transaction referenced by the pointer "trans" and a SetOperation value. Then, on line 19, witnessSet is initialized to contain no instructions.

Lines 20–36 comprise an inner while-loop during which the computer program referenced by the pointer "prog" is repeatedly executed and profiled and the resulting profiles are filtered and used to modify the contents of witnessSet. In the while statement, on line 20, the function "findWitnessSet" calls the function "getNextExecutionParameters," passing to getNextExecutionParameters a pointer to the execution plan "plan," in order to extract from plan the number of times to process the transaction and the set operation to be used in the next iteration, placing those values in local variables "numTrans," and "op," respectively. If getNextExecutionParameters returns the Boolean value TRUE, then another iteration of the inner while-loop commences. If, on the other hand, getNextExecutionParameters returns the Boolean value FALSE, then the execution plan is complete, and the witness set is next evaluated on line 37.

On line 22, the function "execute" is called to execute the computer program referenced by the pointer "prog," instrumented with the monitor set, in order to process the transaction referenced by the pointer "trans" the number of times indicated by the value of the variable "numTrans," placing a profile resulting from the execution of the computer program into the profile "nextProfile." Execute attempts to invoke or initiate the transaction referenced by the pointer "trans" in different ways in order to obtain a representative average profile of processing of the transaction referenced by the pointer "trans." It should be noted that preexisting profiles may be used by the method and system of the present invention, rather than explicitly generated profiles. Thus, an alternative implementation might use plans that indicate a sequence of set operations to conduct on identified preexisting profiles. Next, on line 23, the profile "nextProfile" is filtered via a call to the function "filter." The profile is filtered based on a variety of characteristics, including the values of the local variables "numTrans," "op," and "trans." Filtering may be done automatically, or may be done through user interaction and selection. In one common approach, filtering comprises removing instructions from the profile that have not been executed the number of times "numTrans" that the transaction was processed in the previous call to the function "execute." Other filtering techniques may be used as well. Then, the contents of witnessSet are updated according to the SetOperation value stored in the local variable "op." If op contains the value SET_DIFFERENCE, then, on line 27, witness set is modified to contain the set difference between the current value of witnessSet the profile "nextProfile" via a call to the function "setDifference." If op contains the value SET_UNION, then, on line 30, witnessSet is modified to be the union of the current value of witnessSet and the instructions in the filtered profile "nextProfile" via a call to the function "setUnion." If op contains the value SET_INTERSECTION, then, on line 33, witnessSet is modified to contain to the set intersection of the current value of witnessSet and the profile "nextProfile" via a call to the function "setIntersection." It should be noted that the set operation functions "setDifference," "setUnion," and "setIntersection" remove the count indications from the addresses of instructions in nextProfile prior to performing set operations.

The inner while-loop comprising lines 20–36 continues to iterate until a call to function "getNextExecutionParameters" returns the Boolean value FALSE. When the inner while-loop comprising lines 20–36 is concluded, then, on line 37, the function "qualifyWitnessSet" is called to evaluate the contents of witnessSet determine whether it is of sufficient quality to be designated as a witness set for the transaction referenced by the pointer "trans," as discussed above. The quality of a witness set may be determined computationally or by user intervention and analysis. Quality witness sets may have a number of instructions within a desirable range of numbers, and may also contain instructions that are distributed in certain ways through a section or sections of the program referenced by the pointer "prog." A witness set may also be qualified through additional testing during monitoring of the program referenced by the pointer "prog" instrumented with the witness set. In one approach, a candidate witness set may be refined until the number and identity of instructions within the candidate witness set stabilizes. Generation of an empty candidate witness set during a particular iteration may indicate that either the computer program is not being properly exercised during execution, or that the transaction has not been properly defined or properly correlated with observable events.

If witnessSet does not meet the quality standards, then the function "refineMonitorSet" is called, on line 38, to alter the witness set determination parameters, such as the contents of the initial monitor set "initialMonitorSet" and the execution plan "plan," based on the current values of monitorSet and plan. Following alteration of the witness set determination parameters, the outer while-loop comprising lines 15–39 is again executed, to construct a new witness set.

The above implementation of the instrumented application constructor is of a general nature. Many different approaches to constructing witness sets are embodied in this implementation. Consider, for example, the construction of a witness set for a specific transaction represented in the implementation above as a single complete iteration of the while-loop comprising lines 15–39. First, the application is instrumented according to an initial monitor set on line 17. The initial monitor set can be chosen according to a number of different criteria. Often, choosing a certain set of library functions may be a reasonable initial monitor set for a large class of logical transactions. Alternatively, choosing subroutine calling instructions may provide a sufficient initial monitor set. The determination of a monitor set may be made by an instrumentation technician, automatically by computational methods, or by some mixture of these two strategies.

Next, the execution plan "plan" is initialized, on line 18, to specify a sequence of program executions in order to generate a sequence of profiles. In one common approach, the execution plan may contain the following numTrans/op pairs: 1/SET_UNION, 3/SET_INTERSECTION, 5/SET_INTERSECTION, and 0/SE_DIFFERENCE. This execution plan then controls the while-loop comprising lines 20–36 to conduct the following operations. According to the first numTrans/op pair, the program, instrumented according to the monitor set, is executed to process the transaction one time. The resulting profile is stored into the profile "nextProfile," filtered to retain only instructions executed once, and the instructions contained in the filter profile are stored in witnessSet via a set union operation. Next, according to the numTrans/op pair "3/SET—INTERSECTION," the program is executed to process the transaction three times, and the resulting profile is stored in the profile "nextProfile." The profile "nextProfile" is then filtered to retain only those instructions executed three times. The instruction set "witnessSet" is updated, at this point, via a set intersection operation, to contain the intersection of the instructions currently in witnessSet and the instructions in nextProfile that result from executing the program to process the transaction three times. In general, this greatly reduces the number of addresses in witnessSet so that only those addresses remain that contain instructions executed the same number of times that the transaction in question is processed. Then, according to the numTrans/op pair "5/SET_INTERSECTION," the program is executed so that the transaction in question is processed five times, and witnessSet is modified to contain the intersection of the instructions currently contained in witnessSet and the instruction in the profile "nextprofile" generated by executing the instrumented program to process the transaction five times, filtered to retain only those instructions executed 5 times. At this point, witnessSet contains the addresses of those instructions executed the same number of times that the transaction in question is processed by the program when the transaction is processed one, three, and five times. The addresses of instructions in witnessSet thus have a relatively high probability of being associated with processing of the transaction in question. Generally, processing the transaction 5 times is more than adequate for identifying a high-quality witness set. Finally, according to the numTrans/op pair "0/SET_DIFFERENCE," the program is executed without processing the transaction in question, and the instructions in the resulting profile with counts greater than 0 are subtracted from witnessSet. This has the effect of removing from witnessSet the addresses of any instructions that are executed when the running program does not process the transaction in question. The addresses of the instructions remaining in the witnessSet after the set difference operation are associated with the processing of the transaction in question with very high probability and often comprise a valid and useful witness set.

The instruction set "witnessSet" is analyzed, as indicated in the above implementation by the call to "qualifyWitnessSet" on line 37, by interactive, automated, or some combination of interactive and automated methodologies. If witnessSet is found to be of insufficient quality, then the process of constructing a witness set may be tried again after altering certain of the various parameters involved in witness set determination. For example, the monitor set can be altered, either by adding additional instructions, or selecting fewer instructions in which to initially monitor, the execution plan can be changed to modify the number of times the instrumented application is executed, the number of times the transaction in question is processed in each of those iterations, and to alter the order of set arithmetic operations performed on the resulting sequence of profiles generated.

Consider the above-described approach with reference to the example of FIGS. 1–4. Although a normal application would comprises many hundreds or thousands of subroutines, the operations outlined above are considering only with respect to the routine "routeRequest," shown above in various forms in FIGS. 1–4, to illustrate the above described witness set construction process using a relatively small example. First, suppose that the initial monitor set includes the target addresses of "jsr" instructions. The machine code of FIG. 4 can be analyzed to locate "jsr" instructions at addresses BC3D, BC5F, BCA3, BCA7, and BCB7. The targets of these "jsr" instructions can then be determined to be the following addresses included in the column "final" in Table 4, above: BE10, 1090, 36A4, 3BAC, and F132. If the first instruction of the routine "routeRequest" is also included in the monitor set, then the initial monitor set in this example is:

{BC00, BE10, 1090, 368A, 3BAC, F132}

The application is instrumented to watch for the program counter to be set to the values contained in the monitor set. Various techniques can be used to instrument the application, including inserting jump instructions into the executable at the addresses in the monitor set, copying the instructions originally located at those addresses into memory locations at the target of the jump instructions and adding additional instructions after the original instructions to implement counters associated with the addresses and to return execution to instructions following the addresses. Other techniques include insertion of monitoring routines into the operating system or into firmware of the computer in order to monitor the values of the program counter and to count the number of times that the program counter takes on any new values in the monitor set. Additional monitoring techniques are possible. Next, profiles are generated by running the application and causing the transaction of interest to be processed one time. In the current example, assume that the transaction of interest is the retrieval of employee information. Execution of the application to process the employee retrieval transaction one time would likely generate the following profile:

{BC00:1, BE10:1, 1090:0, 368A:0, 3BAC:0, F132:0} where the counts for each address in the profile appear to the right of the address, separated from the address by a colon. Next, the above profile is filtered to remove any addresses containing instructions that are not executed one time to produce the following set:

{BC00:1, BC10:1}

In the above pseudo-code implementation, the instructions in the above filtered profile is placed into the witness set via a set union operation. Next, the application is executed to process the fetchEmployee transaction three times, and the resulting profile is filtered to retain addresses containing instructions executed three times:

nextProfile={BC00:3, BE10:1}

Then, the witness set is modified to include the set of instructions resulting from a set intersection operation conducted on the current contents of the witness set and nextProfile, which, in this simple example, does not alter the witness set. Note that, for the set operations, the counts, or number of times the instruction contained in an address is executed, is immaterial, and the set operations are conducted only with respect to the instructions contained in the profiles.

witnessSet=witnessSet^nextProfile={BC00, BE10}

It is not uncommon that substantial reduction in the size of a witness set occurs during the above described step, in contrast to this simple example, resulting, in some cases, in a decrease in witness set size from thousands of instructions in the initial monitor set to perhaps tens or hundreds of instructions that are executed once when the transaction in question is executed once, and three times when the transaction in question is executed three times.

Then, the application is executed to process the fetchEmployee transaction five times. The resulting profile is filtered to retain only those addresses containing instructions executed five times, which is then intersected with the witness set. This intersection operation leaves the witness set unchanged in the current simple example:

witnessSet=witnessSet^nextProfile={BC00, BEC0}

Again, in constructing a witness set for a real executable, additional contraction of the number of elements in the profile "setProfile" may often occur at this point.

Finally, the instrumented application is executed without processing the fetchEmployee transaction, perhaps, in this case, instead executing the fetchCustomer transaction, to produce the following profile:

nextProfile={BC00:1, BE10:0, 1090:1, 368A:0, 3BAC:0, F132:0}

A set difference is taken between the current contents of the witness set and the profile "nextprofile" to produce the final candidate witness set:

witnessSet=witnessSet−nextProfile={BC00, BE10}−{BC00:1 BE10:0, 1090:1, 368A:0, 3BAC:0, F132:0}={BE10}

Note that this resulant witness set contains the single address corresponding to the beginning address of the routine "fetchEmployee," as shown in the column "final" of Table 4. In constructing a witness set for a real executable, the initial set may be far larger, and greater filtering may occur during each of the above steps, but the final witness set would likely include the address "BE10" along with probably many other instructions that are executed only during processing of a fetchEmployee transaction.

Although the present invention has been described in terms of a particular embodiment, it is not intended that the invention be limited to this embodiment. Modifications within the spirit of the invention will be apparent to those skilled in the art. For example, as discussed above, the method of the present invention may be practiced over a wide range of degree of automation, ranging from a large degree of manual manipulation and analysis to fully-automated witness set construction systems. For example, various computer program exercising systems are currently available for automatically executing computer programs for testing or performance analysis purposes, and such computer program exercising systems may be used for automating the execution step in the above-described implementation. The witness set construction systems may be implemented in a large number of different ways and using different types of instrumentation and monitoring strategies and systems, different programming languages and modular organizations. Many different types of selection criteria can be applied for selecting instructions for the initial monitor set, for filtering partial set results, for determining the iteration strategies used in the initial and subsequent candidate witness set construction steps, and for determining whether to accept a candidate witness set or to continue to refine the candidate witness set construction process to produce a more useful witness set.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for identifying instructions within a program to include in a witness set for a transaction, the method comprising:

constructing a monitor set that includes locations of instructions within the program;

initializing the witness set;

repeatedly selecting a next profile generated by executing the program to process the transaction a selected number of times, the selected number of times selected from non-negative integers including 0;

selecting a number of instructions from the next profile according to criteria based on execution counts associated with instructions in the next profile; and using the selected number of instructions to modify the witness set.

2. The method of claim 1 wherein constructing a monitor set that includes locations of instructions within the program further includes:

selecting locations of instructions associated with calling a number of library routines.

3. The method of claim 1 wherein constructing a monitor set that includes locations of instructions within the program further includes:

selecting locations of certain types of instructions.

4. The method of claim 1 wherein, when initialized, the witness set is empty.

5. The method of claim 1 wherein a next profile is generated by executing the program to process the transaction a certain number of times.

6. The method of claim 1 wherein a next profile is generated by executing the program to process the transaction under different conditions, during each execution processing the transaction a number of times.

7. The method of claim 1 wherein selecting a number of instructions from the next profile associated with particular counts further includes:

selecting instructions from the next profile associated with counts equal to the number of times that the transaction was processed during execution of the program, the selected instructions thus correlated with processing of the transaction.

8. The method of claim 1 wherein selecting a number of instructions from the next profile associated with particular counts further includes:

selecting instructions from the next profile associated with counts greater than zero, the transaction not processed during execution of the program and the selected instructions thus correlated with processing other than processing of the transaction.

9. The method of claim 1 wherein using the selected number of instructions to modify the witness set further includes:

including in the modified witness set only those instructions contained in the set intersection of the instructions currently included in the witness set and the selected number of instructions.

10. The method of claim 1 wherein using the selected number of instructions to modify the witness set further includes:

including in the modified witness set only those instructions contained in the set difference between the instructions currently included in the witness set and the selected number of instructions.

11. The method of claim 1 wherein using the selected number of instructions to modify the witness set further includes:

including in the modified witness set only those instructions contained in the set union of the instructions currently included in the witness set and the selected number of instructions.

12. The method of claim 1 wherein the instructions are machine instructions and the program is an executable program.

13. The method of claim 1 wherein the instructions are programming language statements.

14. The method of claim 1 wherein the locations are addresses of machine code instructions within an executable program.

15. The method of claim 1 wherein the locations are symbolic locations within a program.

16. The method of claim 1 further including:

evaluating the quality of the witness set;

when the witness set has a quality lower than a threshold quality, selecting a new monitor set;
initializing the witness set; and
identifying instructions within the program to include in the witness set by repeatedly
generating a next profile by executing the program to process the transaction;
selecting a number of instructions from the next profile associated with particular counts;
using the selected number of instructions to modify the witness set.

17. The method of claim 16 wherein evaluating the quality of the witness set includes comparing the number of instructions within the witness set to a desired number of instructions.

18. The method of claim 16 wherein evaluating the quality of the witness set includes comparing the distribution of instructions of the witness set within the program to a desired distribution.

19. A witness set prepared by the method of claim 1 stored in a computer readable medium.

20. A witness set prepared by the method of claim 1 stored in a data structure within the memory of a computer.

21. Electronic signals embodied in a carrier wave that encode a representation of a witness set prepared by the method of claim 1.

22. A system for identifying instructions within a program that may compose a witness set, the system comprising:

a program;

a computer on which the program is executed;

a monitor set containing the locations of instructions within the program;

a monitor that monitors execution of the instructions at the locations of instructions contained in the monitor set to generate profiles;

a witness set; and a witness set generator that repeatedly executes the program, extracts instructions from profiles generated by the monitor, and modifies the witness set by including in the modified witness set instructions resulting from set operations performed on the witness set and the instructions extracted from the profiles.

23. The system of claim 22 wherein the monitor set is a representation of locations of instructions stored in the memory of the computer and includes instructions associated with calling a number of library routines.

24. The system of claim 22 wherein the monitor set is a representation of locations of instructions stored in the memory of the computer and includes locations of certain instructions having particular instruction types.

25. The system of claim 22 wherein the monitor generates a profile while the witness generator executes the program many times under many different conditions.

26. The system of claim 22 wherein the set operations include set intersection, set difference, and set union.

27. Electronic signals embodied in a carrier wave that encode computer instructions that implement the witness set generator of claim 22.

28. A computer-readable medium containing computer instructions that implement the witness set generator of claim 22.

* * * * *